(12) United States Patent
Larson

(10) Patent No.: US 9,048,684 B2
(45) Date of Patent: Jun. 2, 2015

(54) INTELLIGENT HIGH SPEED AUTOMATIC TRANSFER SWITCH

(75) Inventor: Kip McArthur Larson, Rapid City, SD (US)

(73) Assignee: Littelfuse, Inc., Chicago, IL (US)

( * ) Notice: Subject to any disclaimer, the term of this patent is extended or adjusted under 35 U.S.C. 154(b) by 567 days.

(21) Appl. No.: 13/479,372

(22) Filed: May 24, 2012

(65) Prior Publication Data

US 2012/0299381 A1    Nov. 29, 2012

Related U.S. Application Data

(60) Provisional application No. 61/489,783, filed on May 25, 2011.

(51) Int. Cl.
*H01H 47/00* (2006.01)
*H02J 9/06* (2006.01)

(52) U.S. Cl.
CPC ........................................ *H02J 9/06* (2013.01)

(58) Field of Classification Search
USPC .......................................................... 307/125
See application file for complete search history.

(56) References Cited

U.S. PATENT DOCUMENTS

2007/0018506 A1*  1/2007  Paik et al. ..................... 307/115
2009/0296298 A1   12/2009  Divan
2011/0102052 A1    5/2011  Billingsley et al.

FOREIGN PATENT DOCUMENTS

JP    5-115136    5/1993
JP    10-126980   5/1998

OTHER PUBLICATIONS

Tripp Lite Power Protection, Model #: PDUMH20ATNET, "Single-Phase Auto Transfer Switch / Switched PDU 20A 120V, 1U Horizontal Rackmount, 5-15/20R outlets, 2 L5-20P / 5-20P inputs," 2012, 4 pgs.
"TwinSource DCC—II RMSTS Rack Mount Static Transfer Switch," 2001, 2 pgs.
International Search Report dated Dec. 27, 2012 cited in Application No. PCT/US2012/039262, 8 pgs.

* cited by examiner

*Primary Examiner* — Robert L. Deberadinis
(74) *Attorney, Agent, or Firm* — Kacvinsky Daisak Bluni PLLC

(57) ABSTRACT

A transfer system may be provided. The transfer system may comprise a first transfer switch comprising first normally closed contacts and first normally open contacts. In addition, the transfer system may comprise a second transfer switch comprising second normally closed contacts and second normally open contacts. Furthermore, the transfer system may comprise third normally closed contacts with a solid state switch in parallel. A source monitor may be configured to monitor the quality of a primary source and a backup source. And a source control may be configured to operate the first transfer switch, the second transfer switch, the third normally closed contacts, and the solid state switch to transfer a load from the primary source to the backup source in response to the monitored quality of the primary source and the backup source.

21 Claims, 1 Drawing Sheet

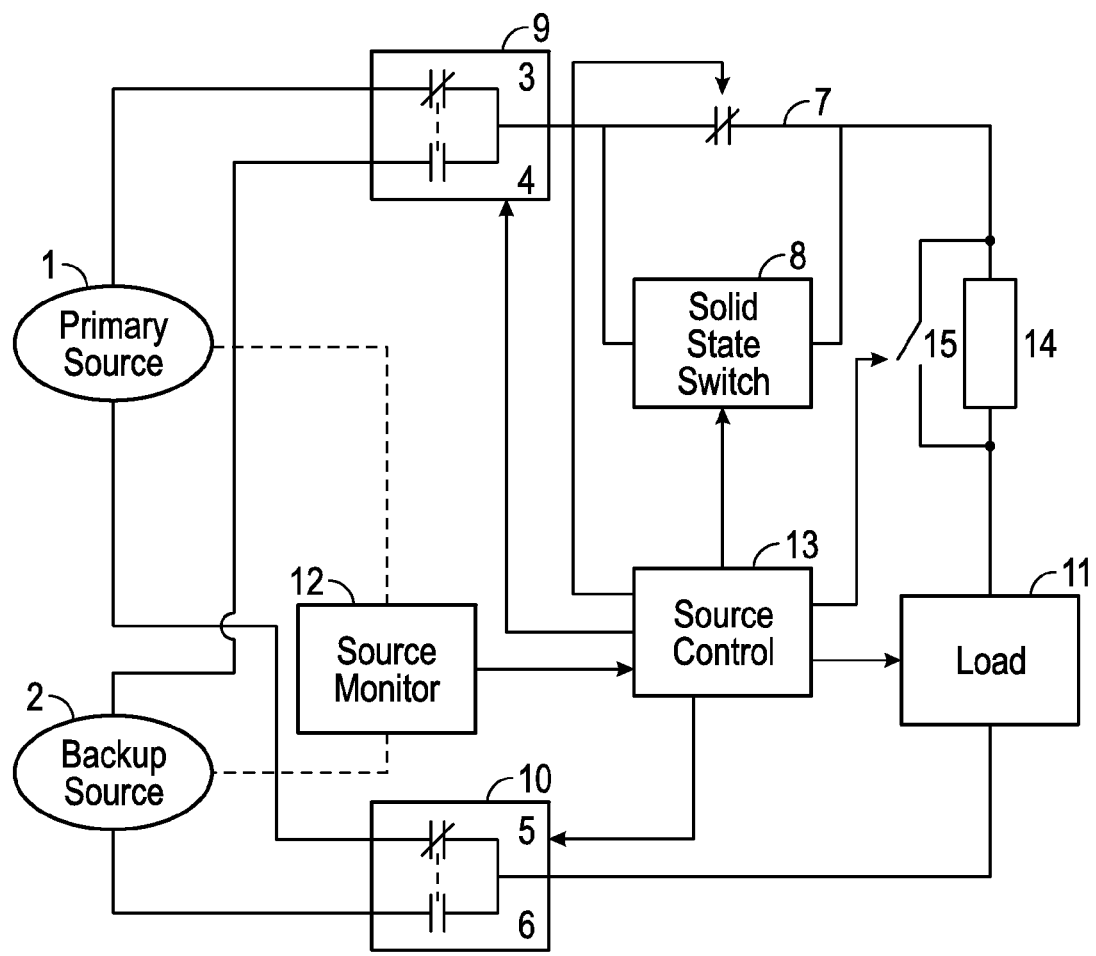

INTELLIGENT HIGH SPEED AUTOMATIC TRANSFER SWITCH

RELATED APPLICATION

Under provisions of 35 U.S.C. §119(e), the Applicant claims the benefit of U.S. provisional application No. 61/489,783, filed May 25, 2011, which is incorporated herein by reference.

BACKGROUND

A transfer switch is an electrical switch that reconnects electric power source from its primary source to a standby source. Switches may be manually or automatically operated. An Automatic Transfer Switch (ATS) is often installed where a backup temporary electrical power source is available, so that the backup source may provide temporary electrical power if the primary utility source fails. Backup power sources may be comprised of redundant utility, UPS, or generators.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A transfer system may be provided. The transfer system may comprise a first transfer switch comprising first normally closed contacts and first normally open contacts. In addition, the transfer system may comprise a second transfer switch comprising second normally closed contacts and second normally open contacts. Furthermore, the transfer system may comprise third normally closed contacts with a solid state switch in parallel. A source monitor may be configured to monitor the quality of a primary source and a backup source. And a source control may be configured to operate the first transfer switch, the second transfer switch, the third normally closed contacts, and the solid state switch to transfer a load from the primary source to the backup source in response to the monitored quality of the primary source and the backup source.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 1 shows a transfer system.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Many types of AC powered electrical equipment may need reliable and continuous power. This can be achieved by providing duplicate power sources that can be switched to a load in a full or partial power failure event. The load may be fed under normal conditions with a primary power source (e.g. a utility.) A backup power source (e.g. an uninterruptable power supply (UPS)) may be switched to in the event the primary power quality is unacceptable for the load. Embodiments of the invention may provide a low cost transfer system for transferring between two unsynchronized power sources with sub-cycle (12 ms or less) power interruption to a load in an alternating current (AC) power system.

In conventional systems, when faulty primary source power is detected, the primary source is removed and the load is switched to a secondary power source. With conventional loads, power interruption (i.e. ride-thru) of a few tens of milliseconds may not disturb the normal operation of the equipment. Recently, pressure to reduce cost of many computer systems and similar electronics has reduced the safe ride-thru time to approximately 10 to 12 milliseconds. These short ride-thru conditions create new challenges to meet reliability and timing requirements for automatic transfer switches especially where the sources are not synchronized. The time required to detect faulty primary power, remove the primary source from the load, and safely connect a back-up power source before the load drops out is an important issue.

In many large expensive power systems, the backup power source can be synchronized with the primary power source to allow a "make-before-break" transition, thus significantly reducing time of power loss to the load. In smaller, low cost systems, synchronization of the power sources is financially impractical, thus requiring a "break-before-make" transition to insure the two power sources do not interact in an undesirable manner.

Complicating the transfer problem is the potential to interrupt or make on large currents with the mechanical switches. This creates welding or arcing on the contacts and can quickly lead to significant degradation of the contact surfaces and unreliable operation of the switch. One conventional solution to prevent welding or arcing is to employ semiconductor arc suppression devices. The devices are switched on prior to the open or closing of switch contacts. This provides protection to the contacts, but the semiconductors are only capable of shutting off at a zero cross of the current. In this conventional solution, significant time must be provided to allow the first source to be disconnected before the second source is applied to the load.

Reliable detection of a power quality problem or complete power failure in sub cycle events is desirable. 4 ms to 6 ms of sampling may be acquired to insure that a real event requiring transfer exists. Transfers between sources due to short power interruptions (2 ms to 4 ms) may create unstable operation of large systems and prematurely wear out the transfer switch hardware. Transfer systems that automatically employ semiconductor protection to the switch contacts prior to the primary source interruption provide satisfactory power to the load during transitions in "brown out" conditions, but they unnecessarily increase load interruption time in the event of a complete loss of power.

The detection time combined with the requirement of current zero cross turn off (up to 8 ms on 60 Hz systems) can quickly exceed the maximum 12 ms ride-thru limit on sensitive electronic equipment. Additionally conventional circuit designs require a minimum "safety" delay between the interruption of the main power source and the backup supply to guarantee that the two power sources are not shorted together unintentionally. This condition is much more serious than the potential degradation of the contacts due to arcing, as the contacts may weld and/or disable both power sources due to tripping the power system short circuit protection.

Another conventional system shortcoming is that one of the solid state relays is always across the open mechanical switch that is not selected to power the load. This leaves this sensitive semiconductor device exposed to line power transients at all times. The failure of a solid state relay due to a transient or unintentional conduction due to a high dv/dt event would short the two power sources together as previously described. Conventional systems address this by using isolation switches to remove the semiconductors from the circuit when not in use. This approach adds additional delays to the transfer sequence for the isolation switches to close, effectively eliminating this approach as a solution in high speed transfers.

FIG. 1 shows a transfer system 100 consistent with embodiments of the invention. As shown in FIG. 1, system 100 may comprise a primary source (1), a backup source (2), a first transfer switch (9), and a second transfer switch (10). First transfer switch (9) may comprise first normally closed contacts (3) and first normally open contacts (4). Second transfer switch (10) may comprise second normally closed contacts (5) and second normally open contacts (6).

Furthermore, system 100 may comprise third normally closed contacts (7), a solid state switch (8), a load (11), a source monitor (12), a source control (13), a current limiter (14), and a current limiter bypass switch (15). Source monitor (12) and source control (13) may be practiced as two respective devices or may be combined as one device. Separately or in combinations, source monitor (12) and source control (13) may comprise a processor or may be practiced in an electrical circuit comprising discrete electronic elements, packaged or integrated electronic chips containing logic gates, a circuit utilizing a microprocessor, or on a single chip containing electronic elements or microprocessors. Solid state switch (8) may comprise, for example, a triode for alternating current (TRIAC) or two silicon-controlled rectifiers (SCRs) configured as a bidirectional electrical current switch. An inductor or resistor may be placed in series with the TRIAC or SCRs to protect the TRIAC or SCRs from high inrush current damage.

On application of primary power source (1) in system 100, power may be conducted directly to load (11) thru normally closed electrical contacts (3, 5, and 7). Source monitor (12) may begin monitoring the presence and power quality of primary source (1) and backup source (2). Source monitor (12) data may be transmitted at high speed to source control (13). If primary source (1) fails to meet the predetermined parameters set in source control (13), transfer of load (11) may be initiated to backup source (2). Intelligence may be programmed into source control (13) to decide if primary source (1) has lost power completely or if a power quality or brown out condition has occurred.

In the event that primary source (1) has completely lost power, a very fast transfer may occur to backup source (2) to prevent disruption of load (11). In this condition, no current may be flowing in third normally closed contact (7), and it can be immediately opened by source control (13) without risk of arcing on third normally closed contact (7). Approximately 1 ms after source control (13) initiates third normally closed contact (7); initiation of transfer to backup source (2) may begin by transfer power from contact (3) to (4) in first transfer switch (9) and contacts (5) to (6) in second transfer switch (10). Source control (13) may wait a short delay to allow contacts (4) and (6) to travel and settle to a closed position, and then source control (13) may initiate the conduction of solid state switch (8). Load (11) may immediately become energized by backup source (2), and third normally closed contact (7) may be closed to provide a low resistance path between backup source (2) and load (11). After a short delay to allow third normally closed contact (7) to close and settle, source control (13) may turn off solid state switch (8) to prepare for the next transfer cycle.

In the event that a brown out or power quality conditions is detected on primary source (1), a transfer may be executed by source control (13), but more time is available, as the load is still receiving some power. In this case, source control (13) may initiate conduction in solid state switch (8) and immediately open third normally closed contact (7). This may allow the current flowing to the load (11) to be bypassed thru solid state switch (8), preventing arcing of the contacts in third normally closed contact (7). Source control (13) may turn off the control to solid state switch (8); after a short delay allowing third normally closed contact (7) time to open. Solid state switch (8) may terminate conduction to load (11) at the next current zero cross. The remaining transfer sequence at this point can be executed from the previous example. The same brown out transfer sequence can be executed in reverse order to transfer load (11) back to primary source (1) when acceptable power returns.

Current limiter (14) may comprise a negative temperature coefficient (NTC) thermistor whose resistance may vary significantly with temperature. For example, when no current is flowing to load (11), the resistance of current limiter (14) may comprise, for example, 1.0 ohm (e.g. current limiter (14) at room temperature.) However, when current begins to flow (e.g. after several cycles) in current limiter (14), the resistance of current limiter (14) may drop, for example, to 0.1 ohm.

When load (11) is picked up cold, it may draw, for example, 10 to 20 times its normal level (i.e. high inrush current). For example, load (11) may comprise a number of switching power supplies having a large number of capacitors. When load (11) is picked up cold, it may draw a high current for several cycles in order to charge the aforementioned capacitors before load (11) drops to its normal level. Current limiter (14) may limit these high cold load currents by having a high resistance during cold load pickup, but may drop to a low resistance when load (11) has dropped to a normal level (e.g. after several cycles) when the capacitors have charged, for example.

Consequently, the current through the contacts of first transfer switch (9), second transfer switch (10), or third normally closed contacts (7), may be limited for several cycles when load (11) is picked up cold through first transfer switch (9), second transfer switch (10), or third normally closed contacts (7) respectively due to current limiter (14). After load (11) is picked up and has dropped to its normal level (e.g. the inrush current has died out), current limiter (14) may be shorted out by source control (13) closing current limiter bypass switch (15). In this way, energy losses from current limiter (14) may be minimized.

In addition, high inrush currents may be created when load (11) is disconnected from an output (i.e. power plug) or potentially switched off by a circuit breaker and then plugged back in or turned on after current limiter bypass switch (15) has been closed. Consistent with embodiments of the invention, source control (13) may detect if current stopped flowing to load (11), if so, open current limiter bypass switch (15), and wait to see current flowing again to load (11) before bypassing current limiter (14) with current limiter bypass switch (15). This may allow transfer system 100 to be connected to the power system(s) and load in any order without damage to transfer system 100. This may be important to users who may not want to have power up sequences.

Consistent with embodiments of the invention, source control (13) may be configured to operate third normally closed contacts (7) prior to operating first transfer switch (9) and second transfer switch (10) to prevent arcing damage or welding of the transfer pair of contacts. Moreover, source control (13) may be configured switch on solid state switch (8) prior to third normally closed contacts (7) open and off after third normally closed contacts open (7) to prevent arcing damage or welding of third normally closed contacts (7). Furthermore, source control (13) may be configured to switch on solid state switch (8) prior to third normally closed contacts (7) close to prevent arcing damage or welding of third normally closed contacts (7). In system 100, all of the electrical contacts may be normally closed between primary source (1) and load (11) on power up to prevent damage to the contacts on high inrush loads, to provide a direct connection to load (11) even in the event of an electronics failure of first transfer switch (9) and/or second transfer switch (10), and to significantly minimize power consumption and heating of first transfer switch (9) and/or second transfer switch (10) switch during normal operation.

Embodiments consistent with the invention may include a computing device. The computing device may comprise a memory storage for maintaining a database and a processing unit coupled to the memory storage. The processing unit may be operative to perform the functionality described above with respect to source monitor (12) and/or source control (13). In other words, processing unit may perform processes for transferring a load from primary source (1) to backup source (2) as described above. Any suitable combination of hardware, software, and/or firmware may be used to implement the memories, processing units, or other components. The aforementioned system and processor are examples and other systems and processors may comprise the aforementioned memories, processing units, or other components, consistent with embodiments of the present invention.

The processing unit ("the processor") described above may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, microcomputers, microprocessors, minicomputers, mainframe computers, and the like. The processor may also be practiced in distributed computing environments where tasks are performed by remote processing devices.

Source monitor (12) and source control (13) may communicate with one another and/or with any other component shown in FIG. 1 over a wire or wirelessly. For example, source monitor (12) and source control (13) may communicate with one another and/or to any other component shown in FIG. 1 over a wired or wireless network. The network may comprise, for example, a local area network (LAN) or a wide area network (WAN). When a LAN is used as the network, a network interface located at any of the components of FIG. 1 may be used to interconnect any of the components of FIG. 1. When the network is implemented in a WAN networking environment, such as the Internet, the components of FIG. 1 may include an internal or external modem (not shown) or other means for establishing communications over the WAN. Further, in utilizing the network, data sent over the network may be encrypted to insure data security by using known encryption/decryption techniques.

In addition to utilizing a wire line communications system as the network, a wireless communications system, or a combination of wire line and wireless may be utilized as the network. Wireless can be defined as radio transmission via the airwaves. However, other communication techniques can be used to provide wireless transmission, including infrared line of sight, cellular, microwave, satellite, packet radio, and spread spectrum radio. For example, the components of FIG. 1 may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802, WiFi, WiMax), a bluetooth interface, another RF communication interface, and/or an optical interface.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A transfer system comprising:
   a first transfer switch comprising first normally closed contacts and first normally open contacts;
   a second transfer switch comprising second normally closed contacts and second normally open contacts;
   third normally closed contacts;
   a solid state switch in parallel with the third normally closed contacts;
   a source monitor configured to monitor the quality of a primary source and a backup source; and
   a source control configured to operate the first transfer switch, the second transfer switch, the third normally closed contacts, and the solid state switch to transfer a load from the primary source to the backup source in response to the monitored quality of the primary source and the backup source.

2. The transfer system of claim 1, wherein at least one of the following comprises a relay: the first normally closed contacts, the first normally open contacts, the second normally closed contacts, the second normally open contacts, and the third normally closed contacts.

3. The transfer system of claim 1, wherein the solid state switch comprises a TRIAC.

4. The transfer system of claim 3, comprising a resistor in series with the TRIAC.

5. The transfer system of claim 3, comprising an inductor in series with the TRIAC.

6. The transfer system of claim 1, wherein the solid state switch comprises two silicon-controlled rectifiers (SCRs) configured as a bidirectional electrical current switch.

7. The transfer system of claim 6, comprising a resistor in series with the SCRs.

8. The transfer system of claim 6, comprising an inductor in series with the SCRs.

9. The transfer system of claim 1, where the source control being configured to operate the first transfer switch, the second transfer switch, and the third normally closed contacts comprises the source control being configured to operate the third normally closed contacts prior to operating the first transfer switch and the second transfer switch.

10. The transfer system of claim 1, where the source control is configured to switch on the solid state switch prior to the third normally closed contacts open and off after the third normally closed contacts open.

11. The transfer system of claim 1, where the source control is configured to switch on the solid state switch prior to the third normally closed contacts close.

12. The transfer system of claim 1, wherein the first transfer switch and the second transfer switch form C relays that prevent the possibility of the primary source and the backup source from being connected together simultaneously.

13. The transfer system of claim 1, wherein the source monitor being configured to monitor the quality of the primary source and the backup source comprises the source monitor being configured to indicate one of the following: a complete power failure, a brown out, and a poor power quality condition.

14. The transfer system of claim 1, wherein the source control is configured to not turn on the solid state switch prior to opening the third normally closed contacts in complete power loss of the primary source.

15. The transfer system of claim 1, further comprising a current limiter in series with the load, the current limiter being sized to limit inrush current through at least one of the following: the first normally closed contacts, the first normally open contacts, the second normally closed contacts, second normally open contacts, and the third normally closed contacts.

16. The transfer system of claim 15, wherein the current limiter comprises a negative temperature coefficient (NTC) thermistor.

17. The transfer system of claim 15, further comprising a current limiter bypass switch in parallel with the current limiter.

18. The transfer system of claim 17, wherein the source control is configured to close the current limiter bypass switch after inrush currents have died out.

19. The transfer system of claim 17, wherein the source control is configured to:
   detect if current stopped flowing to the load;
   open the current limiter bypass switch in response to detecting that the current stopped flowing to the load, and determine that current is flowing again to the load before bypassing the current limiter with the current limiter bypass switch.

20. The transfer system of claim 1, wherein the primary source is connected to the first normally closed contacts and the second normally closed contacts.

21. The transfer system of claim 1, wherein the backup source is connected to the first normally open contacts and the second normally open contacts.

* * * * *